April 27, 1954

R. M. GOODWIN 2,676,394

ASSEMBLING MACHINE

Filed Aug. 16, 1952

INVENTOR.
RICHARD M.
GOODWIN
BY
his ATTORNEYS.

April 27, 1954

R. M. GOODWIN 2,676,394

ASSEMBLING MACHINE

Filed Aug. 16, 1952

INVENTOR.
RICHARD M. GOODWIN
BY
Willits, Hardman and Fehr
his ATTORNEYS.

INVENTOR.
RICHARD M.
GOODWIN
BY
his ATTORNEYS.

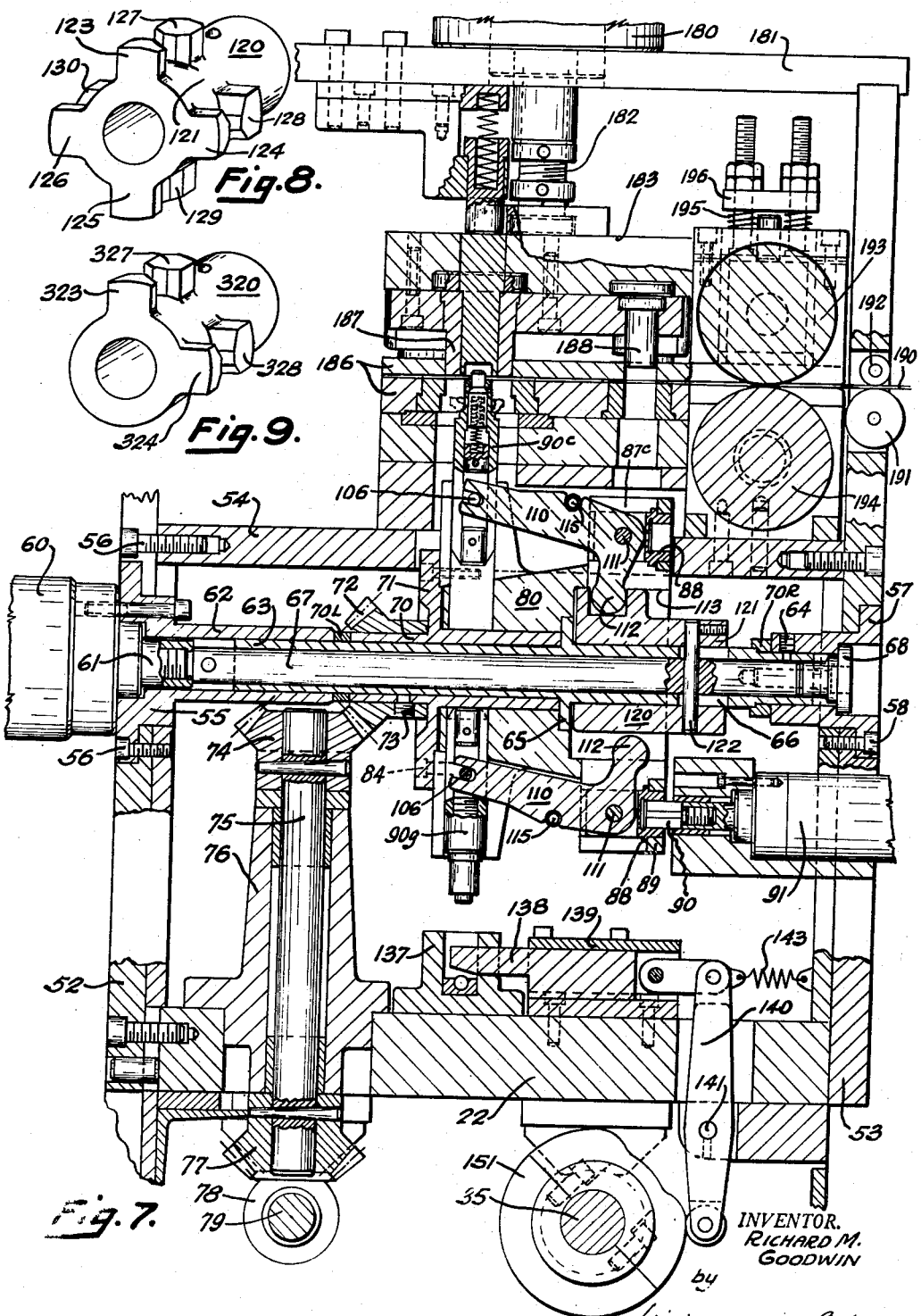

April 27, 1954
R. M. GOODWIN
2,676,394
ASSEMBLING MACHINE
Filed Aug. 16, 1952
9 Sheets-Sheet 8
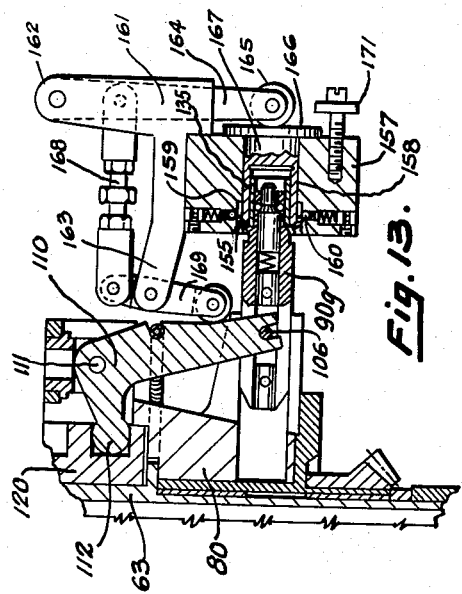
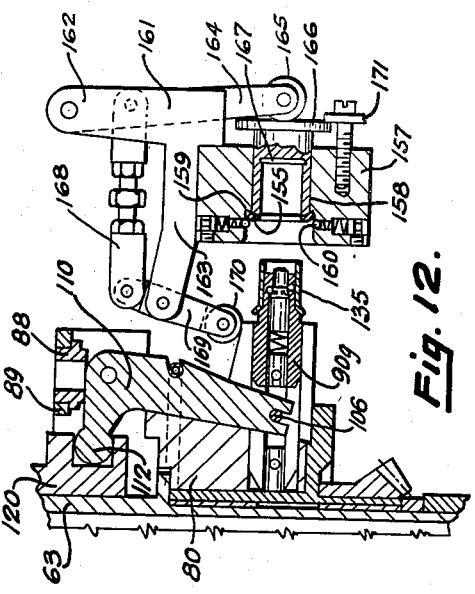
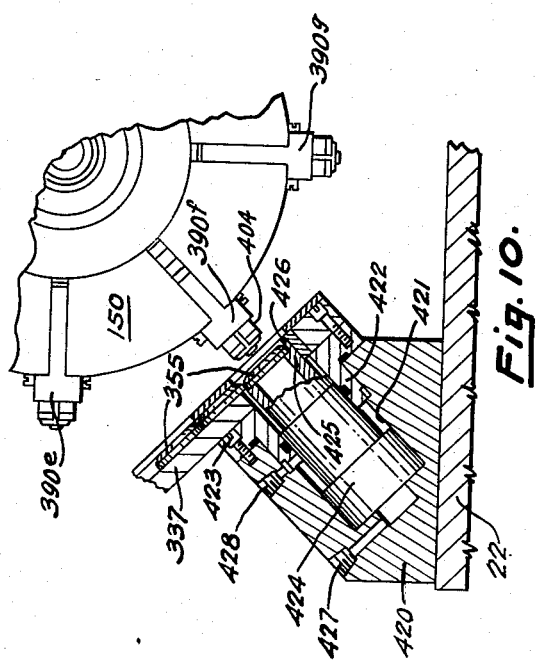
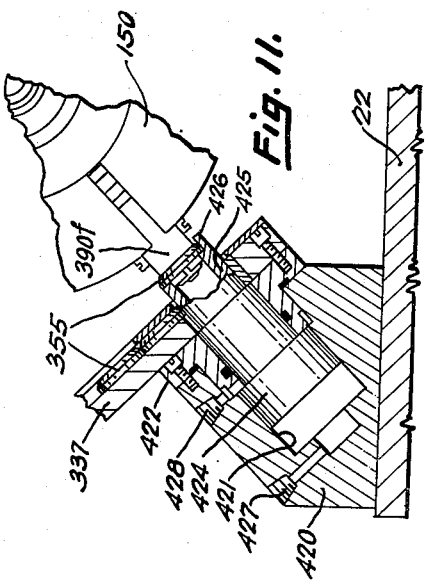
INVENTOR.
RICHARD M. GOODWIN
BY
his ATTORNEYS.

April 27, 1954
R. M. GOODWIN
2,676,394
ASSEMBLING MACHINE
Filed Aug. 16, 1952
9 Sheets-Sheet 9
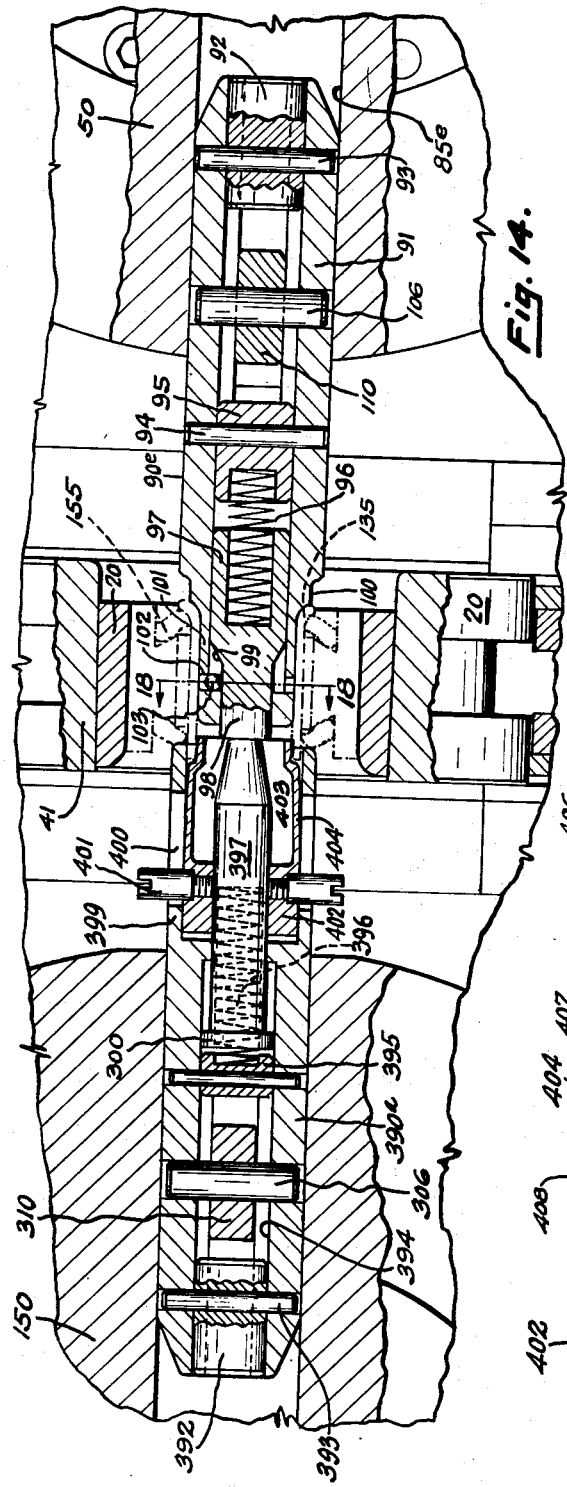
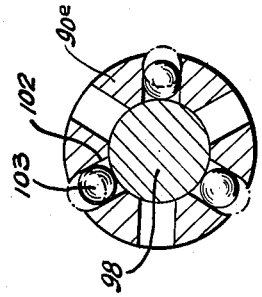
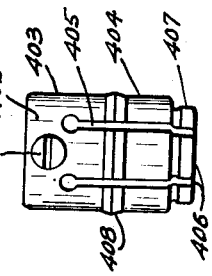
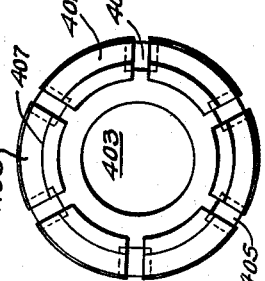
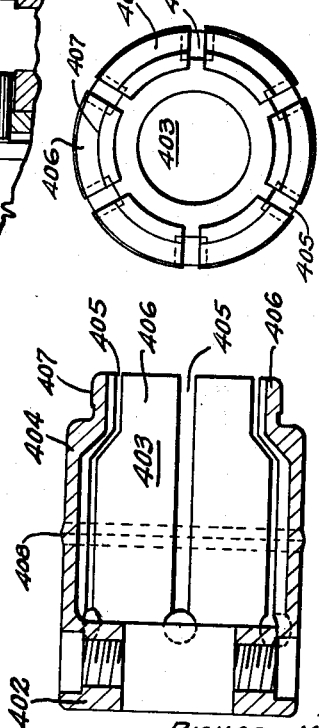
INVENTOR.
RICHARD M. GOODWIN
BY
Willits, Hardman and Fisher
his ATTORNEYS.

Patented Apr. 27, 1954

2,676,394

UNITED STATES PATENT OFFICE 2,676,394

ASSEMBLING MACHINE

Richard M. Goodwin, Anderson, Ind., assignor to General Motors Corporation, Detroit, Mich., a corporation of Delaware Application August 16, 1952, Serial No. 304,774

10 Claims. (Cl. 29—205)

This invention relates to a commutator assembling machine.

The machine of the present invention is one of several machines each of which performs specific functions in the production of commutators. The first machine, for instance, aligns a predetermined number of alternately engaging metal bars and insulating separators in a row, then introduces said row into a holding ring so that an annulus of bars and separators is securely held in the holding ring which is ejected from this first machine and directed by a conveyor to the machine of the present invention. This first machine is the subject matter of U. S. application Serial No. 267,098, filed January 18, 1952.

This machine inserts a core-sleeve carrying an insulating washer and a clamping collar into the annulus assembled and held in the holding ring delivered to this machine by a conveyor from the first machine. Another insulating washer and clamping collar is slipped upon the exposed end of the core-sleeve in the assembled annulus, after which the holding ring is moved from this machine to another where a further operation on the holding ring content is performed.

It is therefore among the objects of the present invention to provide a machine operative automatically to place and clamp successively an annulus supporting holding ring in a fixed position in the machine, then to insert a core-sleeve into the annulus in said clamped holding ring, said core sleeve bearing an insulating washer and a clamping collar at each end thereof, after which the holding ring is ejected from the machine.

Further objects and advantages of the present invention will be apparent from the following description, reference being had to the accompanying drawings wherein a preferred embodiment of the present invention is clearly shown.

The machine of the present invention has a plurality of parts feeding guides or slide-ways leading to it from sources of supply. One feeding guide directs a row of core-sleeves toward a station in the machine, where the leading core-sleeve is located and held in a proper position relatively to one rotatable conveyor of the machine. A second feeding guide provides a row of clamping collars the leading one of which is located and held in a proper position in the machine relatively to said one conveyor of the machine and the said core-sleeve station. A third feeding guide aligns clamping collars and directs them toward another station in the machine where the leading clamping collar is held in proper position relatively to a second rotatable conveyor of the machine. Two separate insulator strip conveyors are provided, one for directing a strip of insulating material to a station predeterminately located relatively to the core-sleeve locating station and the said one rotatable conveyor, the second for directing a strip of insulating material to a station predeterminately located relatively to said second conveyor of the machine and to the station associated therewith for locating clamping collars relatively thereto. At each of these stations to which the insulating strip is directed, means for stamping insulating washers from said strips are provided, the stamping means acting also as pushers for moving the formed washers upon the respective conveyors associated with the stations at which the washers are formed. A single station is provided in the machine to which successive annulus supporting holding rings are directed and rigidly clamped.

The two previously mentioned rotatable conveyors are in the form of dials provided at each side of the holding ring clamping station, the axis of the conveyors being at right angles to but in alignment with the axis of the holding ring when clamped in said station. Each rotary conveyor has eight carriers equally spaced and radially slidably supported therein. A common driving means intermittently rotates said conveyors concurrently so that eight concurrent pauses in rotation are provided during one revolution of said conveyors. At each pause of the one conveyor the carriers thereon, spaced at 90° one to another, are actuated outwardly of the conveyor, the one picking up a core-sleeve, the next one in the direction of conveyor rotation, having a clamping collar placed on the core-sleeve thereon, the core-sleeve on the next carrier receiving an insulating washer and the fourth carrier, aligning with the clamped holding ring, inserting the core-sleeve, insulating washer and clamping collar into the annulus in the clamped ring.

At each pause in movement of the second conveyor which is rotated in a direction opposite the first conveyor, one carrier thereof aligns with the clamping collar feeder, associated with this second conveyor, where means are provided for pushing a clamping ring upon the carrier not extended from the conveyor at this station. At the same time, the carrier at the washer forming station is extended from the conveyor for picking up an insulating washer formed at this station. Concurrently the carrier coaxially aligning with the holding ring clamped in the machine, is actuated to push the clamping collar and engaging insulating washer from the carrier onto the core-sleeve placed in the annulus in the clamped holding ring by the first conveyor. When the cooperating, aligned carriers of the two conveyors are retracted and thus withdrawn from the annulus in the holding ring, said ring is released and ejected from the machine and a new one located and clamped in position. All extended carriers on both conveyors are concurrently retracted and while they are in the retracted position both conveyors are rotated through one-eighth of a revolution for locating the next following carriers with the respective stations to repeat their functions as just described. While stationary, each conveyor is positively locked against rotation by a stop pin inserted into an opening in the respective conveyor during its pause.

Any suitable control mechanism is actuated by the holding ring rolling into its clamping position in the machine, whereby a clutch is rendered effective for a single revolution to connect the machine with a main power drive. After one revolution the clutch is rendered automatically inactive until a new housing ring rolls into place. Thus the machine can not function until a work piece to be operated upon is in proper position in the machine.

In the drawings:

Fig. 1A is a front view of the body of one conveyor of the machine;

Fig. 1B is a side view, partly in section of the member shown in Fig. 1A;

Figs. 4A, 4B, 4C, 4D, 4E and 4F illustrate cams shown in Fig. 4;

Fig. 7 is a sectional view illustrating the operating mechanism of conveyors and their carriers and taken along the line 7—7 of Fig. 2;

Fig. 8 illustrates the actuator for the carriers of one conveyor;

Fig. 9 is a similar view showing the actuator for the carriers of the second conveyor;

Fig. 10 is a view, partly in section, showing one of the feeding devices of the machine;

Fig. 11 is a view of the device shown in Fig. 10, in a different operating position;

Fig. 12 is a sectional view of another feeding device shown in one operating position;

Fig. 13 is a view of the device of Fig. 12 in another operating position;

Fig. 14 is a sectional view, substantially full size, showing parts of the machine in final assembling positions;

Fig. 15 is a sectional view of a collet embodied in the mechanism of Fig. 14;

Fig. 16 is an end view of said collet;

Fig. 17 is a detail view of the collet shown in Fig. 15; and

Fig. 18 is a transverse sectional view taken substantially along the line and in the direction of the arrows 18—18 in Fig. 14.

The machine of the present invention is designed to perform one operation in the continuous assembly of the commutators. As previously mentioned, this machine receives holding rings from another companion machine, these holding rings containing an annulus of alternately engaging metal segment bars and insulating separators and inserts a core-sleeve in the said assembled annulus within the holding ring which core sleeve has an insulating washer and a clamping collar at each end thereof. After this machine inserts said core-sleeve and the two insulating washers and clamping collars, the holding ring is ejected from the machine and delivered to another companion machine for a further operation.

Figure 1:
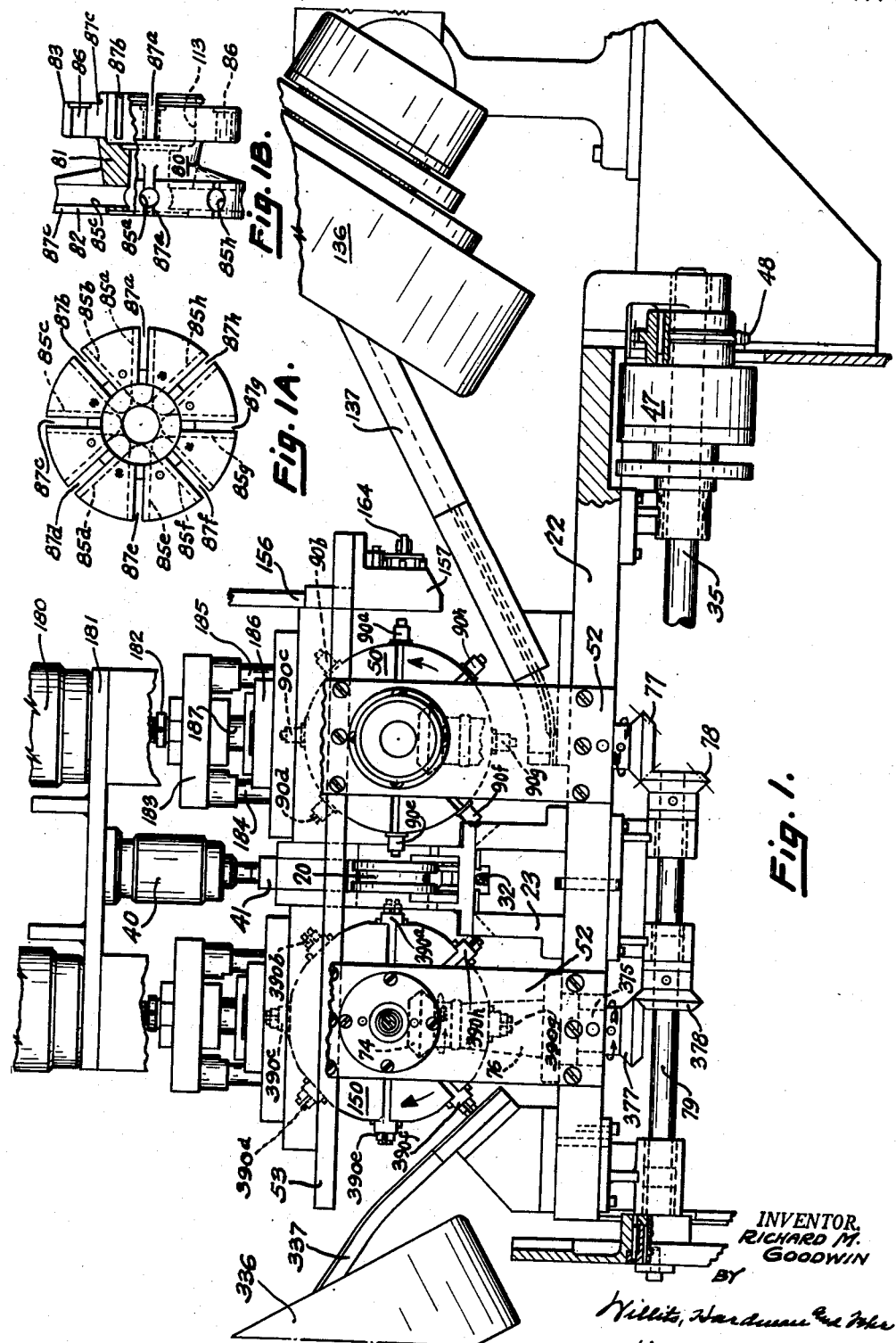
Fig. 1 is a side view of the commutator assembling mechanism of the machine.
Figure 2:
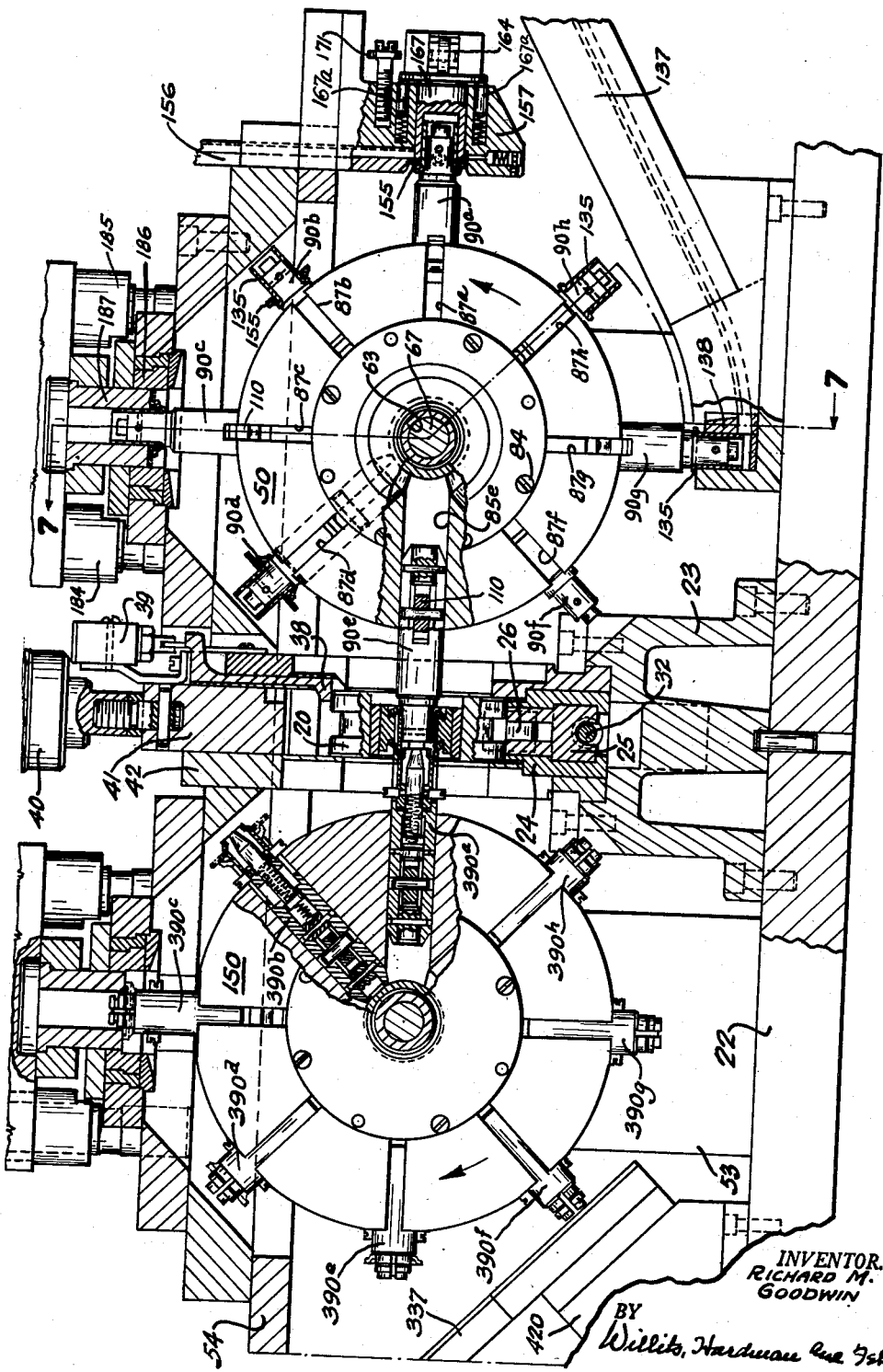
Fig. 2 is a fragmentary, part sectional view of mechanism shown in Fig. 1.
Figure 5:
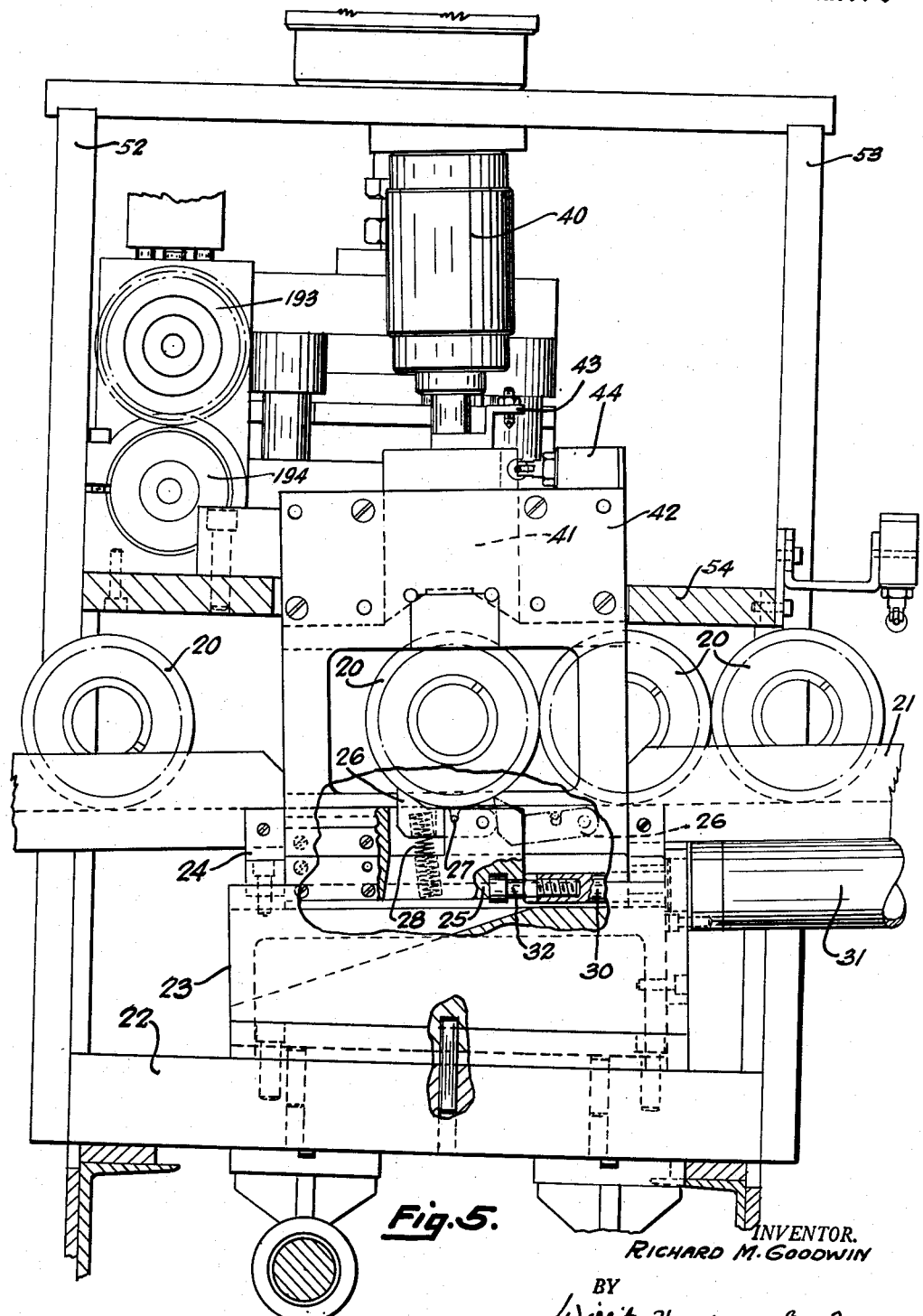
Fig. 5 is a fragmentary, part sectional view illustrating one locating and clamping device of the machine.

As the holding ring is provided with the assembled annulus in the first machine it is placed upon a chute having sufficient slope so that said ring may roll along the chute and into a fixed location within the machine of the present invention. The holding rings are designated by the numeral 20 and the chute along which these rings roll from one machine to another by the numeral 21. This chute is supported upon the platform 22 of this machine by a standard 23 as shown in Figs. 1 and 2. A trackway element 24 is secured to standard 23 so that it aligns with the chute 21, the holding rings rolling from the chute 21 onto the trackway 24, which is of rigid construction to permit clamping of the ring in proper position upon this trackway as will be described. Trackway 24 slidably carries a block 25 which may be reciprocated in said track in the direction of the rolling path of the holding rings 20. In this sliding block 25 a finger 26 is pivotally supported, said finger being urged against a stop pin 27 by a spring 28 so that said finger 26 extends from block 25 into the path of movement of the holding rings 20 as they roll onto the trackway 24. This block 25 is secured to the movable piston rod 30 of a power actuated cylinder 31 by means of an adjustable screw stud 32 so that when the cylinder 31 is activated in one instance the piston rod 30 thereof will move the block 25 forwardly in this trackway 24 and when activated in another instance said cylinder 31 will move the block 25 in the other direction into normal position in which said block 25 is held until the cylinder 31 is again activated to shift the block 25 forwardly. The solid line position of the finger 26 in Fig. 5 shows the forward or locating position of the block 25 and its attached finger 26. In this position said finger 26 is engaged by the leading holding ring 20 of the row of rings in chute 21 and is stopped and held in this position, where mechanism is rendered effective rigidly to clamp it upon the supporting block. While the ring 20 is clamped, the power device 31 is rendered active to retract the block from the locating position into a position in which the fingers assume a position as indicated by the dot-and-dash line in Fig. 5. In this position the finger 26 engages the clamping ring 20 on the rear side thereof and in such a manner that the finger is depressed partially so as to compress its spring, thereby causing the finger to exert a pushing force upon the holding ring 20 which becomes effective to start the ring upon its rolling movement from the machine when the clamping effort is released on the ring 20. As soon as the ring 20 is fully assembled and released by the clamping means it will roll from the machine and then the finger 26 is moved into normal position by its spring so that the next leading ring 20 on the chute 21 may roll into engagement with finger 26 in its retracted position. When the power device 31 is energized to move the block 25 forwardly toward its normal position the finger 26 will, as a result thereof, be moved forwardly permitting the now leading ring 20 to follow the finger and roll into the clamping position previously occupied by the released ring.

When a ring 20 moves into the clamping position, that is, into the position as shown in Fig. 5, it engages and actuates a pusher rod 38 shown in Fig. 2, this pusher rod in turn actuating the micro-switch 39 to close a circuit causing the power device 40 to be activated for moving a clamping block 41 into clamping engagement with the located holding ring 20. The clamping block 41 is slidably supported in a slideway 42 secured to the standard 23. As the clamping block 41 (see Fig. 5) is moved downwardly by the power device 40 for the purpose of clamping the leading ring 20 in proper position in the machine, it moves an adjustable switch actuator 43 into engagement with micro-switch 44, actuating said micro-switch to effect energization of the solenoid magnet 45 connected with a lever 46, see Fig. 4, so that said lever 46 releases a portion of a single revolution clutch 47 whereby a power driven sprocket 48 may transmit driving power to the entire machine for one revolution of said clutch. Sprocket 48 is connected to any suitable source of power by a chain designated by the numeral 49 in Fig. 4. The shaft 35 driven by the clutch for one revolution thereof, extends through the clutch and has a cam 36 mounted thereupon for actuating the air valve 37 for purposes to be described. Thus as the clamping block 41 descends to engage and clamp the leading holding ring 20 it sets the entire machine in motion to complete one revolution of its driving clutch whereby one complete cycle of the machine is effected, after which the clutch 47 is rendered automatically effective to disconnect the power drive sprocket 48 from the drive shaft 35 of the machine.

The double acting micro-switch 44 when actuated by the descending plunger not only effects energization of the one revolution clutch 47 but it also effects energization of the power device 31 to retract the block 25 attached thereto from the extended into the retracted position, the finger 26 attached to said block being shown in dot-and-dash lines in Fig. 5 when in the retracted position. This block 25 is maintained in this retracted position until the operation on the clamped holding ring 20 by the machine is completed and the assembled ring 20 unclamped and released. When the machine has completed its operation upon the assembly in a holding ring 20, the shaft 35 will have been rotated for one complete revolution and the cam 36 mounted upon said shaft will actuate air valve 37 causing the power device 40 to be energized to withdraw clamping block 41 from clamping engagement with the ring 20 and thereby release it. When the ring is released by the clamping block 41 the partially depressed spring loaded finger 26 will urge said ring to move outwardly of said machine, the finger 26 being moved to its normal position by the spring so that the next leading ring 20 may roll downwardly over the block 25 to engage and be stopped by finger 26. The previously clamped ring 20 when rolling from the clamped position will permit the pusher lever 38 to return to normal position so that the micro-switch 39 is again actuated causing energization of the power device 31 to move its attached block 25 forwardly toward the ring locating position whereby the ring now engaging finger 26 will be permitted to follow said finger and roll into alignment with the clamping block 41. As this new ring rolls into position it will actuate the pusher rod 38 to operate micro-switch 39 thereby rendering the clamping mechanism effective to clamp the positioned ring in the machine.

In its clamped position as shown in Figs. 1, 2 and 5, the holding ring 20 is ready to receive a core sleeve, insulating washers and clamping collars. These are placed within the annulus, held in the holding ring, by means of radially reciprocated carriers supported upon rotary conveyors. The rotary conveyors are designated by the numerals 50 and 150, and as shown in Figs. 1 and 2, are supported in the machine so that one is at one side of the clamping ring 20 and the other is at the opposite side thereof. The axes of these two conveyors are at right angles to the axis of the clamped holding ring 20 but are in alignment therewith so that the radially movable carriers on said conveyors are movable into coaxial alignment with the clamped holding ring 20 as shown in Fig. 2.

Fig. 7 illustrates the method and means for mounting and operating one carrier of the machine the second carrier being mounted and operated in substantially the same manner and therefore a detailed description of this mechanism for this one carrier will suffice. The platform 22 of the machine has two spaced side wall portions 52 and 53 having an intermediate apertured shelf 54 secured therebetween. Wall 52 is apertured to receive the bearing collar 55 secured thereto by screw studs 56 while side wall 53 has a similar bearing collar 57 secured in an aperture in said wall by studs 58, both bearing collars 55 and 57 being in coaxial alignment. Bearing collar 55 has the power actuated cylinder 60 attached thereto, said cylinder having an actuating rod 61 extending into the elongated tubular portion 62 of the bearing collar 55. Bearing sleeve 63 extends into and is supported by the tubular extension 62 of bearing collar 55, the other end of this bearing sleeve 63 extending into the bearing collar 57 and being immovably attached to said bearing collar 57 by a set screw 64. This bearing sleeve has an annular outwardly extending flange 65 intermediate its ends. Between said flange 65 and the end of sleeve 63 extending into bearing collar 57, sleeve 63 has two diametrically opposite elongated slots 66. A rod 67 slidably fits in bearing sleeve 63 one end of the rod being securely fastened to the reciprocative rod 61 of the power actuated member 60, the other end of rod 67 having a stop-plug 68 secured thereto by a central screw stud. This stop-plug 68 is reciprocative in a recess within the bearing collar 57 so that when the power member 60 is activated to move the rod 61 thereof inwardly and outwardly of the member 60, the rod 67 will be reciprocated back and forth within the bearing sleeve 63, stop-plug 68 on said rod reciprocating within the recess of the bearing collar 57.

Between the annular flange 65 on the bearing sleeve 63 and the inner end of the tubular extension 62 of bearing collar 55 sleeve 63 rotatably supports another sleeve 70 which has an outwardly extending annular flange 71 intermediate its ends. A bevel gear 72 is secured to sleeve 70 by a set screw 73, or it may be keyed to said bearing sleeve 70, said bevel gear or pinion 72 meshing with the bevel gear 74 drivingly secured to shaft 75 which is journaled in a standard 76 secured to the platform 22 in any suitable manner. This shaft 75 has another beveled gear 77 attached to its outer end, said beveled gear 77 operatively engaging and being driven by a bevel gear 78 attached to the drive shaft 79. The drive shaft 79 and its bevel gear 78 are clearly shown and identified in Fig. 4 which will detailedly be described hereinafter.

Inasmuch as this detailed description of the method of mounting and the means for driving the conveyors is substantially identical and for the sake of brevity this description is directed to the conveyor 50. Conveyor 50 consists of a main body 80 shaped in the form of a spool, that is, having a central barrel or body portion 81 and outwardly extending annular flanges 82 and 83 at each end thereof. (See Figs. 1A and 1B.) The main body 80 of the conveyor is secured to the flange 71 of the sleeve 70 by means of a plurality of screw bolts 84. The annular flange 82 on the main body 80 adjacent the end attached to the flange 71 has eight radial openings therein, 85a to 85h respectively, which are equally spaced one from the other and extend from the outer peripheral edge of the conveyor to the inner annular opening of the main body 80 which fits about the driving sleeve 70. The outer, flat face of the flange 83 has eight recesses all designated 86 respectively, provided in a circular row therein. The axis of each opening 86 bisects the axis of a respective radial opening 85a to 85h. Both flanges 82 and 83 have transverse slots equal in number to the radial openings 85a to 85h and the openings 86, the center of each slot being in the plane of the axis of these openings. In Fig. 1A these slots are designated by the numerals 87a to 87h respectively and it may be seen that the slot 87a communicates with the radial opening 87a in the flange 82 and also with the opening 86 in the flange 83, the remaining slots communicating with the remaining openings in the same manner. Each opening 86 respectively has a thimble 88 (see Fig. 7) held in the main body of the conveyor by a hardened ring-plate 89 which seats in an annular recess provided in the end face of the flange portion 83 of the conveyor body. These eight thimbles 88 in the eight respective openings 86 provide receptacles into which a stop lock-plunger 90 is insertible by a power actuated member 91 so as to hold the conveyor against rotation in eight equally spaced positions or stations during one revolution of the conveyor as will be later described.

As aforedescribed the power driven pinion 74 rotates its meshing pinion or gear 72 which, keyed to the sleeve 70, causes the flange 71 of said sleeve to be rotated and thus the conveyor body 80 will be rotated inasmuch as it is attached to the flange 71. The driving mechanism rotating shaft 79 is of such a nature that for each revolution of the main drive shaft 35 of the machine shaft 79, driving pinion 74 will cause the conveyor 50 to be rotated intermittently providing a predetermined pause eight times during one revolution of the said conveyor. By referring to Fig. 4, it may be seen that the shaft 35 has an actuator crank 95 which cooperates with a Geneva gear 96 mounted upon shaft 79, said Geneva gear being so designed and constructed that for each revolution of the actuator 95 the Geneva gear is rotated through one increment of rotational movement or, more specifically, through 45° of movement. The conveyor 50 is so positioned on its driving sleeve 70 so that at each period of pause in the rotation of the conveyor 50, which, as have been described, occurs eight times in one revolution of the conveyor 50, radial openings 85a to 85h respectively of the conveyor will be in coaxial alignment with the axis of the holding ring 20 clamped in position in the machine by the clamping member or block 41. Thus the radial openings 85a to 85h respectively are successively brought into coaxial alignment with the clamped holding ring 20 during one revolution of the conveyor 50 which would be eight revolutions of the main drive shaft 35.

The radial openings 85a to 85h respectively of the conveyor 50 each reciprocatively supports a spindle designated, as shown in Figs. 1 and 2 by numerals 90a, 90b, 90c, 90d, 90e, 90f, 90g and 90h. All of the carriers on conveyor 50 are identical and therefore only one will be described detailedly, reference being had to the Figs. 7 and 14 for the constructive description thereof. In Fig. 14, a full size sectional view, illustrates the carrier 90e of Fig. 2, which is the carrier 90e of Fig. 2, is the carrier in coaxial alignment with the clamped holding ring 20. The carrier comprises a tubular member 91 slidably carried in the radial opening 85e of the conveyor 50. At its inner end this tubular body portion 91 of the carrier has a hardened wear or abutment block 92 secured therein in any suitable manner, Fig. 14 showing a cross pin 93 for this purpose. Another cross pin 94 in this carrier immovably secures an abutment block 95 substantially midway of the carrier, this abutment block being engaged by one end of a spring 96, the other end of the spring seating in a recess provided in the plunger 97 reciprocatively supported within the carrier 90e. This plunger 97 has a reduced diameter end 98 slidably supported in an opening in the outer end of the carrier 90e, a tapering cone-shaped area 99 joining the smaller diameter portion 98 of the plunger with the portion thereof slidably engaging the inner wall of said carrier. The outer end of the carrier 90e has a short annular area 100 of lesser diameter of the main body portion of the carrier and a second reduced diameter portion 101 smaller in diameter than the portion 100 and considerably longer than said portion. In the wall of this smallest outer diameter portion of the carrier 90e, radial openings 102 are provided, the outer ends of said radial openings being constricted to prevent clutch balls 103 in said openings from escaping therefrom. These clutch balls ride upon the smaller diameter portion 98 of the plunger 97 and as a result of said plunger 97 being urged outwardly of said carrier 90e by the spring 96 the tapered cone-shaped area 99 of said plunger urges these clutch balls 103 outwardly of the openings 102 so that normally a portion of these balls are exposed outside the annular surface of the smallest diameter portion 101 of the carrier 90e. Thus when sleeves are placed upon the portion 101 of the carrier, a sleeve being shown in dotted lines in Fig. 14, the outwardly cammed balls 102 will grip the sleeve on the carrier to hold it securely in position on the carrier until the plunger 97 is actuated to move the tapering or cone-shaped portion of said plunger away from the balls and thus to permit them to move inwardly of said opening in said carrier and thereby release the sleeve supported thereon. As has previously been mentioned all of the carriers 90a to 90h inclusive, supported in the respective openings of said carrier are of identical construction and include the reciprocative plunger and the clutch balls controlled thereby.

Each carrier has a cross pin 106 supported therein substantially midway between the cross pins 93 and 94. This cross pin 106 is operatively engaged by the forked end of an operating lever by means of which the carrier is reciprocated or, more specifically, extended and retracted in the conveyor 50. Fig. 7 clearly illustrates this actuating lever. The one designated by the numeral 110 is pivotally supported by a pin 111, said pin being carried by the conveyor body 80 transversely of the slot 87c. This finger 110 is nested in slot 87c, its forked end extending over the cross pin 106 so as to be operatively connected with the carrier 90c. An angular arm portion 112 of the finger 110 extends radially into the central recess 113 in this body portion 80 of the carrier 50. Each slot 87a to 87h respectively within the carrier body 80 is provided with a finger similar to the finger 110 each finger being pivotally supported by a pin 111 and each respective finger having a forked end operatively engaging the carrier in the radial opening communicating with the slot in which the finger is supported. A spring commonly called a garter spring 115 surrounds all eight carriers in the conveyor 50 fitting in the notches in each carrier and exerting a force on the respective carriers to urge them in a direction in which they tend to move their respective carrier connected thereto inwardly of the conveyor or what is referred to as retractively in the conveyor. Fig. 7 shows a finger 110 operatively connected with the carrier 90g and also provided with an angular arm portion 112 which extends radially into the recess 113 of the carrier body 80. Like the finger connected with carrier 90c this other finger urges the carrier 90g inwardly or toward its retracted position within the carrier housing 80.

The means for actuating fingers 110 in the carrier 50 is an interrupted spool-shaped cam 120 having a hub portion 121 centrally apertured to slidably fit upon the immovable bearing sleeve 63. A cross pin 122 shown in Fig. 7, extends through the longitudinal slot 66 in the immovable sleeve 63 and through the reciprocative shaft 67 whereby said cam 120 is reciprocative on this sleeve 63 by the movement of shaft 67 under the influence of the power device 60. The extent of the back and forth movement of the shaft 67 and its attached cam 120 is limited by stop collars 70L and 70R which may be altered to obtain the desired reciprocatory movement. As shown in Fig. 8, which is a perspective view of the cam 120, the body or barrel-shaped portion 121 of said cam has two sets of four outwardly extending lugs, one set being spaced axially from the other to provide an interrupted annular channel between said sets. The four lugs in the set adjacent the end of the cam are designated by the numerals 123, 124, 125 and 126. The four lugs in the adjacent set are designated by numerals 127, 128, 129 and 130. Lugs 123 and 127 are diametrically opposite the respective lugs 125 and 129 while lugs 126 and 130, at 90° to the lugs 123, and 127, are diametrically opposite the lugs 124 and 128 respectively. The adjacent faces of the sets of lugs are chamfered at each side. Inasmuch as the shaft 67 to which cam 120 is attached by pin 122 is only movable in an axial direction and is not rotatable, cam 120 will likewise only be movable reciprocatively with the shaft 67. The arrangement of these lugs provides for a clear passageway between vertical and horizontal lugs as shown in Fig. 8. The normal position of fingers 110 under the influence of the spring bracelet 115 is the position in which the finger 110 engaging the carrier 90g is shown in Fig. 7. When the fingers are in this normal position the cam 120 is in the position on sleeve 63 in which the pin 122, attached to the cam, is at the end of the longitudinal slot 66 more adjacent the bearing collar 57. In this position the interrupted annular space between the two sets of outwardly extending lugs on the cam aligns with the radially inwardly extending arm portions 112 of the fingers. Now when the conveyor 50 is rotated through 45° of rotary motion or ⅛ of the entire revolution thereof four alternate fingers will be brought to rest between oppositely disposed lugs of the cam 120 while the other four alternate finger arms 112 will be brought into alignment with the open space between two facing lugs and the next adjacent two facing lugs on the cam. Thus when the cam 120 is next reciprocated by the reciprocation of rod 67 under the influence of the power device 60 so that said cam is moved from the position more adjacent the bearing collar 57 in Fig. 7 toward the bearing collar 55 in the same figure, the four alternate fingers whose radially inwardly extending arm portions 112 are between respective lugs on the cam will be actuated about their respective pivotal pins 111 so that these four fingers will extend the respective carriers or, more specifically, move said carriers outwardly of the conveyor 50. In Fig. 2 the four carriers 90a, 90c, 90e and 90g are shown in this extended position by the action of their respective fingers under the influence of the reciprocating cam 120. Inasmuch as the other four alternate fingers 110, more specifically, the fingers operatively connected with carriers 90b, 90d, 90f and 90h have their inwardly radially extending arm portions 112 aligned with the space between oppositely disposed lugs on the cam, reciprocation of the cam 120 will in no way move these fingers and thus said fingers will be maintained in normal position by the spring bracelet 115 as shown in Fig. 7 where the finger 110, engaging the carrier 90g, is held in this normal carrier retracting position. At a predetermined point in the operation of the machine the power device 60 is again rendered active to reciprocate the rod 67 in the opposite direction so that the cam 120 is again returned to its normal position more adjacent the bearing collar 57. As the cam 120 moves toward this position the alternate fingers 110 connected with the previously extended carriers will retract said carriers to their normal position within the conveyor 50 after which said conveyor 50 is again rotated through another increment or 45° of one revolution thereof which brings the radial arm portions 112 of the fingers 110, operatively connected with the previously retracted carriers, into alignment with the interrupted annular groove 120 so that when said cam 120 is again reciprocated forwardly, as regards Fig. 7, said fingers will actuate 90b, 90d, 90f and 90h its extended positions in which the next carrier 90 coaxially aligns with the holding ring 20 clamped in position in the machine. Said aforementioned conveyor 50 is securely locked in the carrier shifting position by the power actuated locking pin 90. Said pin 90 actuated by the power device 91 in properly timed sequence relatively to the rotation of the carrier 50.

The function of this machine is to apply a sleeve core and two insulating washers and clamping collars to the assembled annulus held within the holding ring 20 as each holding ring is clamped in the machine by the clamping block 41. The carriers of the conveyor 50 are supplied with a core sleeve, a clamping collar and an insulating washer at various points of interrupted movement in the rotation of the conveyor 50. Fig. 2 clearly illustrates the carrier 90g of the conveyor 50 in the position in which a core sleeve 135 is applied thereto. A hopper 136 contains core sleeves which enter the chute 137 forming a line therein, said core sleeve sliding under the force of gravity toward the end of the chute 137 so that the leading core sleeve in the row of sleeves in said chute is brought into coaxial alignment with the carrier to be supplied with said core sleeve. In the drawings, Figs. 1 and 2, this carrier is shown to be 90g of conveyor 50.

The Fig. 2, as do other figures of the drawings show the core sleeves to have an outwardly extending annular flange. In order that the flange on the core sleeve in direct alignment with the carrier 90g and to be picked up thereby is not overlapped by the flange of the next adjacent core sleeve in the chute 137, so that the proper pick up by the carrier is not interfered with, a separator plug or cam 138 is provided, which is movable between the first two core sleeves in the chute for holding them apart to avoid overlap of the flanges thereon. This plug 138 is carried in block 139 attached to base 22 and extends through an opening in the chute 137. The separator plug 138 is operatively connected with a lever 140 pivoted at 141 on a pin supported by a platform 22. A spring 143 yieldably urges the separator plug 138 into the retracted position so that its end is held out of engagement with the core sleeve. The one end of the lever 140 has a follower held in substantial alignment with the cam 151 so that the follower on lever 140 will follow the camming contour and be actuated thereby. Cam 151 is operatively mounted upon the drive shaft 35 and thus actuates separator plug 138 into posiiton once for each ⅛ revolution of the carrier 50, or, more specifically a core sleeve in position each time one of the eight carrier 90a to 90h inclusive in conveyor 50 is moved into alignment with the located core sleeve. After the conveyor 50 has been rotated so that its carrier 90g aligns with the core sleeve 135 held in proper position by the separator plug 138, said conveyor is locked in this position by the locking plug 90 and then the cam 120 is reciprocated by the power device 60 so as to actuate finger 110 operatively connected with the carrier 90g to extend or reciprocate said carrier outwardly of the conveyor 50. As the carrier 90g is extended and its outer end caused to enter into the located core sleeve 135 the clutch balls 103 in said carrier similar to the one shown and illustrated in Fig. 14, engage the core sleeve to grasp it and securely hold it upon the carrier when reciprocation of the cam 120 by the power device 60 actuates the fingers 110 operatively connected with said carrier to retract the carrier into the conveyor. Thus in the retracted position with carrier 90g in the position in Fig. 2, said carrier will be supplied with a core sleeve 135.

During the new incremental rotation of the conveyor 50, carrier 90g is moved counterclockwise into the position shown to be occupied by the carrier 90h in Fig. 2. The following carrier 90f is subsequently moved into alignment with the leading core sleeve in the chute 137 and, when the conveyor 50 pauses and is locked in the next 45° position, carrier 90f will be operated to pick up the core sleeve in position in the chute. In its new position which may be referred to as the "four o'clock" position of the carrier 50, as regards Fig. 2, carrier 90g will be held in its retracted position due to the fact that in this position the inwardly extending radial arm 112 of the finger engaging said carrier will be in alignment with the through passage between oppositely disposed lugs of the pair of lugs on cam 120. When the carrier 50 has again rotated through the 45° increment of its one revolution carrier 90g will have been moved into the "three o'clock" position shown occupied by the carrier 90a in Fig. 2. In this position the carrier with its core sleeve 135 gripped thereon will be supplied with a clamping collar 155. Clamping collars 155 are directed from a source of supply by gravity through a chute 156 to a position in which the leading clamping collar coaxially aligns with the carrier of the conveyor at the "three o'clock" position. At this "three o'clock" position or station a mechanism is provided for applying the clamping collar 155 to the core sleeve 135 on the carrier which, for purposes of this description and to follow the sequence of one carrier for a complete cycle of the machine will be referred to as the carrier 90g. A block 157 is attached to the end of the chute 156 in any suitable manner, this block having an opening 158 provided therein which is in coaxial alignment with the carrier in this three o'clock position. Figs. 2, 12 and 13 illustrate this portion of the machine detailedly. The opening 158 is counterbored to provide a shoulder 159 which is engaged by the leading clamping collar 155 under the influence of the oppositely disposed spring loaded balls 160 in block 157, said balls securely holding the leading clamping collar in position in block 157 against the shoulder 159. A bracket 161 is supported on block 157 this bracket having relatively angular arms 162 and 163. Arm 162 pivotally supports a lever 164 at its one end, the other end of said lever having a roller 165 engaging the head 166 of recessed plunger 167 slidably supported in the opening 158. A link 168, longitudinally adjustable to vary its length as desired, has its one end pivotally attached to lever 164 adjacent its pivoted end, the other end of said link being pivotally attached to one end of a lever 169, pivoted intermediate its ends to the bracket arm 163, the other end of said lever 169 having a roller 170 lying in the path of the movement of finger 110 so as to be engageable by said finger.

Normally the elements supported by block 157 are in the position as shown in Fig. 12 in which the recess plunger 167 is in its normal inoperative position engaging the stop limit screw 171 supported in block 157 as positioned by the spring pressed pins 167a (see Fig. 2). The finger 110 is actuated by cam 120 to move the carrier 90g outwardly of the conveyor portion 80 or into its extended position, as shown in Fig. 13. The core sleeve 135, gripped upon the outer end of said carrier 90g, will be moved toward the held leading clamping collar 155, the core-sleeve entering the collar 155, causing the clamping collar 155 to be slipped upon and over the said core sleeve which, as shown in Fig. 12, has a flared inner end. When the finger 110 of carrier 90g has moved outwardly sufficiently to engage roller 170 on lever 169 continued movement of said finger in a counterclockwise direction under the influence of cam 120 will actuate lever 169 to effect a pull on link 168 which in turn moves lever 164 clockwise about its pivotal support on bracket arm 162 so that the roller 165 on said lever 164 will actuate the recessed plug 167 forwardly or in a direction opposite to the movement of the carrier 90g under the influence of finger 110. As recessed plug 167 moves forwardly it urges the core sleeve 155, normally engaged by the inner edge of said recessed collar 167, past the spring loaded balls 160 causing the clamping collar 155 to be snapped into final position upon the core sleeve 135 on carrier 90g in which position the clamping collar 155 abuts against the flared end of the core sleeve 135 as shown in Fig. 13. After this application of the clamping collar 155 upon core sleeve 135 is completed the cam 120 is actuated by the power device 60 to operate finger 110 in a clockwise direction as regards Figs. 12 and 13, resulting in a retraction of the carrier which, in response to the operation at this three o'clock station now carries a core sleeve 135 with a clamping collar 155 in abutting position with the flared end of the core sleeve (see carrier 90b, Fig. 2).

The next rotation of the conveyor 50 through 45° of its one revolution will move the carrier 90g from the three o'clock position into the one o'clock position. As shown in Fig. 2 carriers in this position remain in their retracted relation with the conveyor 50 inasmuch as the fingers of the carriers at this one o'clock position will not align with the actuating lugs of the cam 120. In fact the fingers of the carriers at the one o'clock position of the conveyor 50 align with the space between the pairs of extending lugs in this cam and thus when the cam is reciprocated by its power device the fingers of the carriers at the one o'clock position are not engaged and therefore remain inactive so that the bracelet spring about said fingers will maintain the carrier in retracted position.

Now the conveyor is again rotated counterclockwise 45° so that the carrier 90g is moved from the one o'clock position or station into the 12 o'clock position or station shown in Fig. 2 to be occupied by the carrier 90c. At this 12 o'clock station an insulating washer of single or multiple thickness is placed upon the carrier in abutment with the clamping collar surrounding the core sleeve on said carrier. The insulating washer, which may be of a single or a mulitple thickness, is formed from a continuous strip or strips of insulating material at this station by a punch and die mechanism, the punch, after forming the washer, continuing its movement to push the formed washer upon the extended carrier 90g now at this station.

Figure 3:
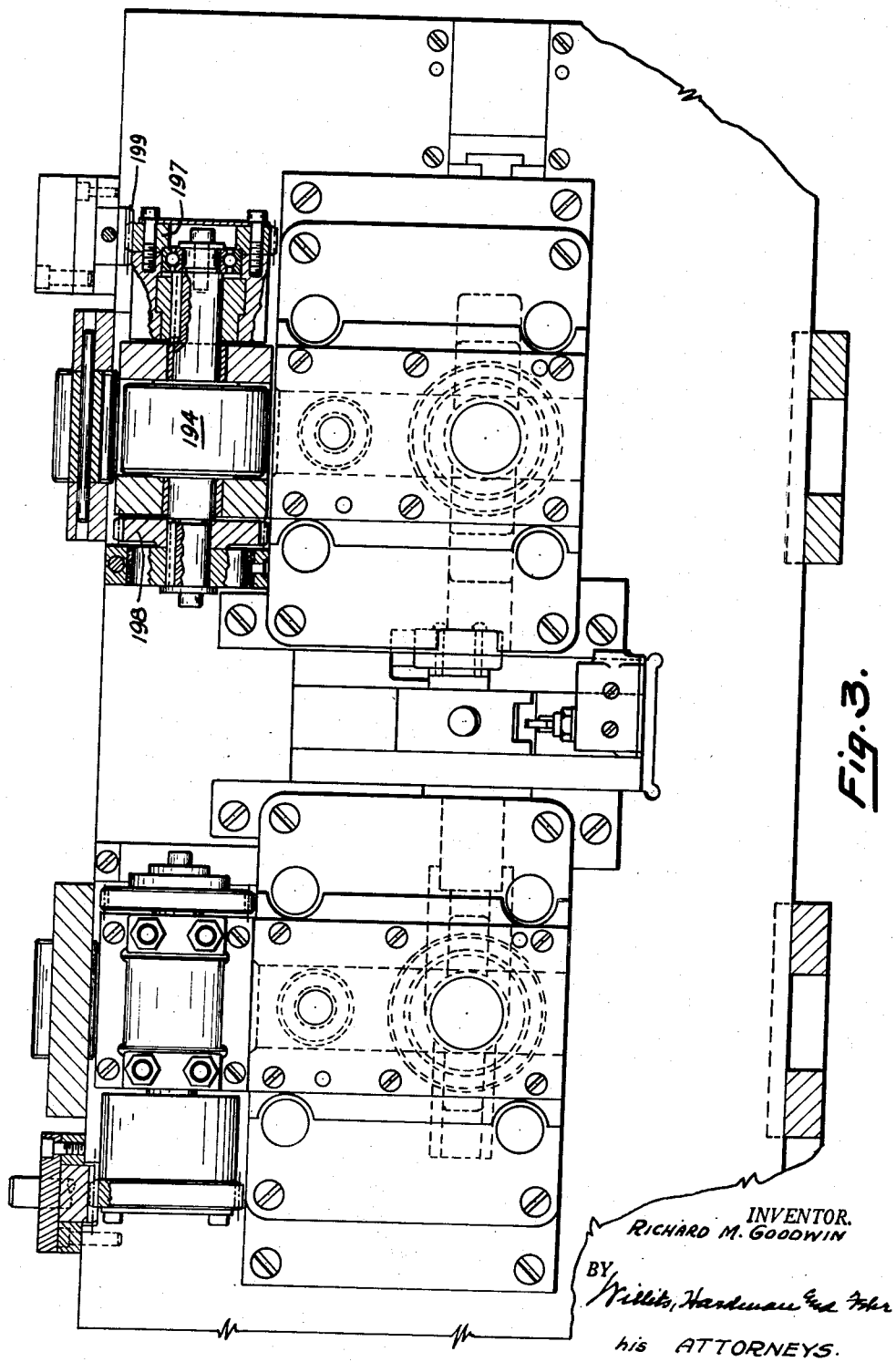
Fig. 3 is a plan view of the portion of the machine shown in Fig. 2.
Figure 4:
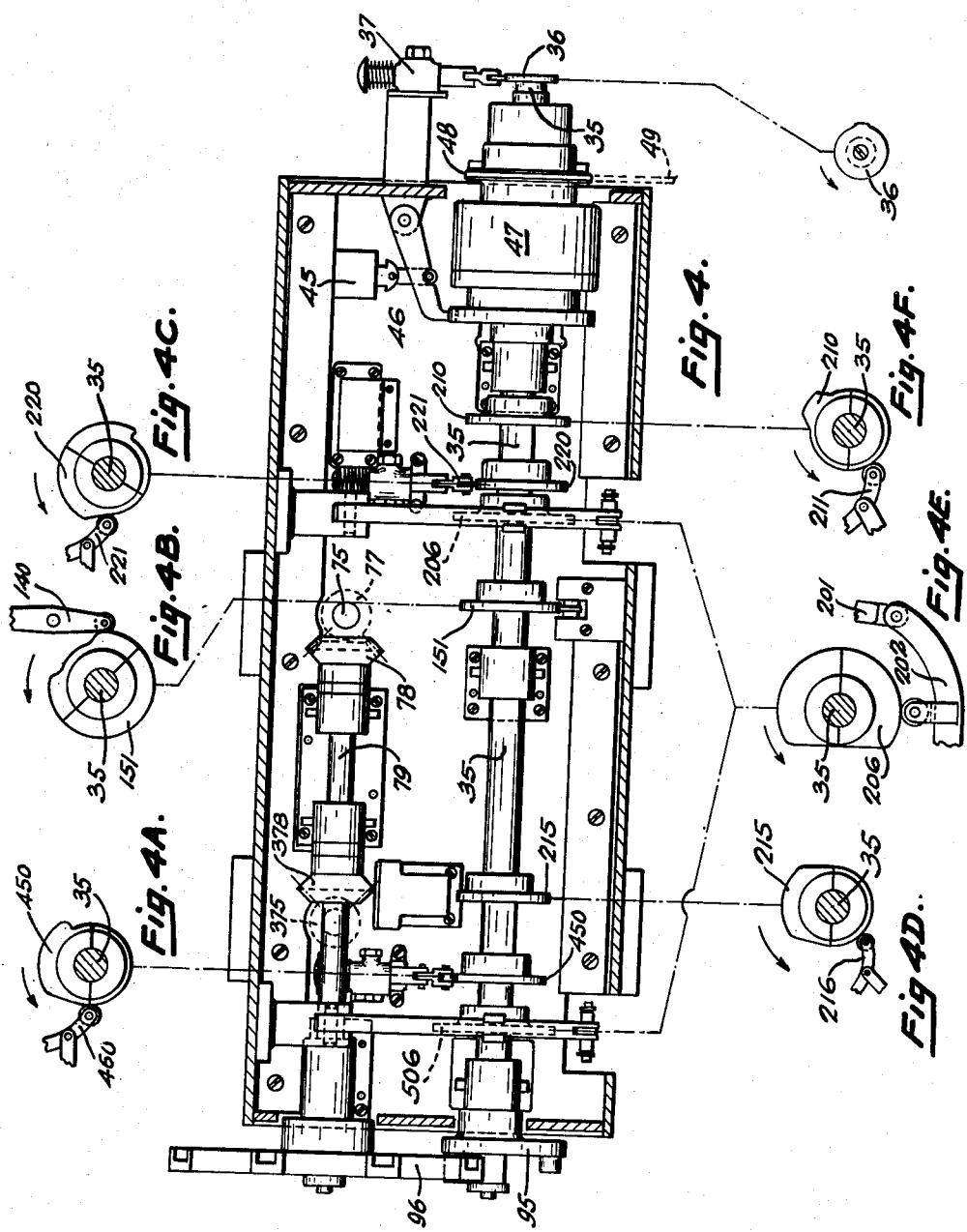
Fig. 4 is an inverted plan view illustrating driving mechanism of the machine.
Figure 6:
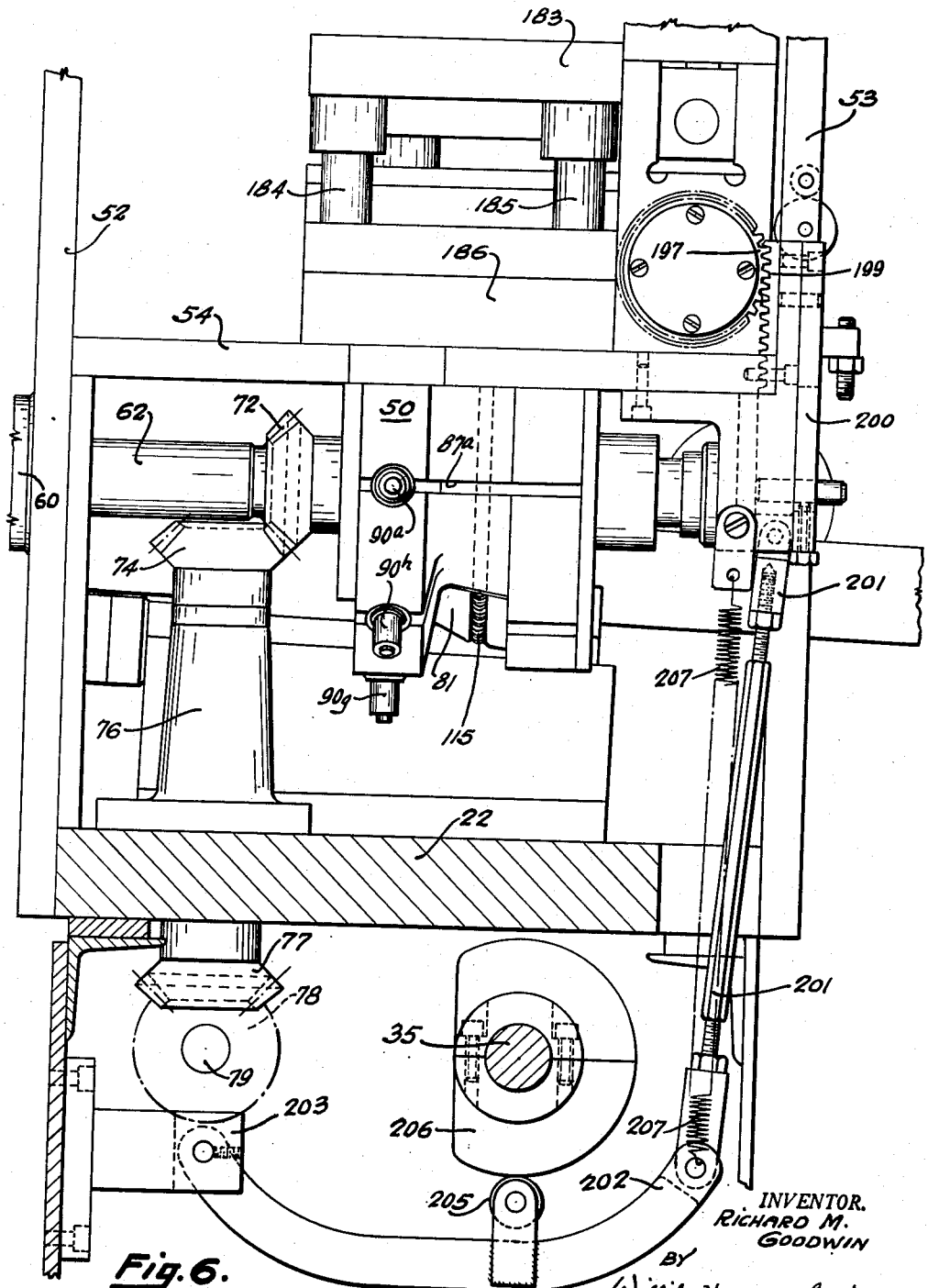
Fig. 6 is a fragmentary view showing the operating mechanism for one feeding device of the machine.

In describing the washer forming and supplying mechanism at this 12 o'clock station of the machine reference will be had to the Figs. 1, 2, 3, 6 and 7. Fig. 1 shows the general arrangement of this mechanism where a power device 180 is mounted upon a shelf 181 permanently secured to a portion of the machine frame. This power device has a reciprocative shaft 182 attached to a cross head 183 which is slidably carried by guide rods or shafts 184 and 185 supported by a die block 186. Two punches 187 and 188 are carried by the cross head 183 the punch 187 being tubular the outer diameter of which is equal to the outer diameter of the washed to be formed. Along side punch 187 the punch 188 is attached to the cross head 183 this punch 188 being solid and of substantially the same diameter as the inner opening in the hollow punch 187. A continued strip of insulating material 190 either of single or multiple thickness and of a width sufficient to form the necessary washer therefrom is fed from a source of supply through adjacent guide rollers 191 and 192 supported in the frame or wall of the machine, said strip passing between two oppositely disposed power driven feed rollers 193 and 194 carried in blocks secured to the frame 33 of the machine. Roller 193 is rotatable but it also is movable toward and away from the roller 194. The spindle supporting block 193 is carried by a member slidable in the stationary block attached to the frame of the machine, this member being yieldably urged toward the roller 194 by springs 195 interposed between the roller supporting member and a stationary plate 196 attached to the main block. Thus, roller 193 is yieldably urged into engagement with the insulating strip 190 passing between the feed rollers 193 and 194. Fig. 3 shows the method of mounting the rotatable roller 194, the spindle of which has two gears 197 and 198 secured thereto. Fig. 6 illustrates the mechanism for rotating these rollers. Gear 197 of roller 194 is operatively engaged by a rack 199 reciprocatively supported in a trackway 200 attached to the machine. This rack has one end of a link 201 connected thereto, the other end of said link being attached to one end of a lever 202, the other end of said link being pivotally mounted upon a bracket 203 attached to the stationary frame of the machine. Link 201 is constructed so that it may be adjusted lengthwise to vary its length thereby making controllable the operation of the feed roller 194. Gear 198 on the spindle of roller 194 is operatively engaged by a similar gear secured to the spindle of roller 193 so that when the roller 194 is rotated in one direction by the operation of the rack 199, roller 193 is rotated in the opposite direction at the same speed due to the engagement of a gear on the spindle of roller 193 identical with gear 198 and meshing therewith. Thus as the rollers 193 and 194 are actuated the insulating strip clamped therebetween will be moved forward from the guide roller 191 and 192 toward the punch and die mechanism in the machine. The lever 202 attached to link 201 has a cam follower 205 substantially held in engagement with the contour surface of the cam 206 by a spring 207 connected to an immovable part of the machine at one end and to the lever 202 at its other end. Cam 206 is mounted upon the drive shaft 35 as illustrated in Figs. 4 and 4E. The cam is of such formation that during one period of one revolution of the drive shaft 35 the rollers are actuated in the insulating strip advancing direction while during the lesser portion of a revolution of the shaft 35 the rollers are rendered inoperative.

The feeding movement of the rollers 193 and 194 moves the length of the insulation material over the die block 186. At a predetermined time in the operation of the machine, cam 210, shown in Figs. 4 and 4F, actuates a lever 211 which in turn operates a power control valve for rendering the power element 180 active so that it moves the cross head 183 and its supported punches 187 and 188 toward the die block 186, the hollow punch 187 stamping an apertured portion of the insulating material therefrom to form the insulating washer continued movement of this hollow punch 187 pushing the washer over the core sleeve on the carrier 90g now in this 12 o'clock position, said washer being urged by said hollow punch 187 into engagement with the clamping collar 155 on the core sleeve of this extended carrier 90g. The carrier 90g in this instance will be in the identical position in which 90c is shown in Fig. 7. As the cross head 183 is moved by the power device 180 to effect operation of the punch 187 for completing the formation of the punch 187 for completing the formation of the insulating strip between the rollers 193 and 194 and the punch 187 for the purpose of forming the central opening in said washer. Upon the next advance of the insulating strip by the rollers 193 and 194, this pierced opening in the insulating strip 190 is moved by the rollers 193 and 194 into coaxial alignment with the carriers in the 12 o'clock position or station of the machine. As soon as the washer is placed in position upon the carrier 90g in the 12 o'clock position the cam 120 is again actuated by the power device 60 under the influence of cam 215 shown in Figs. 4 and 4E attached to the drive shaft 35 and being adapted to operate control member 216 which is a portion of the control valve which controls the application of power to the power device 60. Incidentally it may be mentioned at this time that cam 220, mounted on shaft 35 and shown in Figs. 4 and 4C, operates lever 221 of a control device which regulates the application of power to the power element 91 operatively connected to the locking pin 90 which, when extended and moved into engagement with the respective openings in the conveyor body 80, locates and locks said conveyor against movement in each of the eight stations into which said conveyor is moved during one revolution of the conveyor.

The conveyor is again rotated through its semi-final 45° of rotative movement whereby the carrier 90g is moved from the 12 o'clock position into the 10 o'clock position and carrier 90g will not be extended in its conveyor. However, when the conveyor 50 is moved through its final 45° of rotary motion the carrier 90g will be brought into the 9 o'clock position or station where it coaxially aligns with the holding ring 20 clamped in the machine. When the conveyor 50 is locked in this position the cam 120 is actuated by the power device 60 to operate the fingers 110 associated with the carrier 90g so that it is extended from the conveyor and thereby has its outer end moved into the annulus consisting of alternately engaging metal commutator bars and insulating separators, said annulus being securely held in the holding ring 20 clamped in the machine. Fig. 14 shows the position of the carrier when fully extended from the conveyor 50 so that the core sleeve 135 thereon is pushed into the assembled annulus with the insulating washer clamped against the one sloping edge of the keystone shaped inwardly extending portions of the bars and separators of the annulus. When fully inserted into the annulus the core sleeve 135 and the clamping collar 155 and insulating washer on said core sleeve remain within the annulus while the carrier is retracted by the reverse operation of the cam 120 under the influence of the power device 60.

Thus during one complete revolution of the conveyor 50 said conveyor pausing and being held immovable eight times during said one revolution, each carrier therein is provided with a core sleeve, a clamping collar, and insulating washer, following which each carrier is moved to insert the core sleeve, washer and clamping collar thereon into the annulus in the clamped holding ring. Therefore, during one revolution of the carrier 50, eight holding rings are provided with core sleeves, insulating washers and clamping collars respectively.

In order to complete this portion of the assembly of the commutator it is necessary to place another insulating washer and clamping collar upon the end of the core sleeve extending from the assembled annulus in the holding ring. This machine provides a second conveyor 150 similar to the conveyor 50 for this purpose. As shown in Fig. 1, conveyor 150, like conveyor 50, has eight equally spaced radially reciprocated carriers 390a, 390b, 390c, 390d, 390e, 390f, 390g and 390h. The conveyor 150 is constructed substantially like the conveyor 50 having a body portion with an outwardly annular flange at each end thereof rendering the conveyor spool-shaped. Conveyor 150 is mounted upon a drive sleeve in exactly the same manner as is the conveyor 50, the drive sleeve being rotated by beveled gears similar to beveled gears 72 and 74 associated with the conveyor 50, these beveled gears in turn being rotated by a shaft 375 similar to shaft 75 driving gear 74, this shaft 375 supporting a bevel gear 377 which meshes with a bevel gear 378 mounted on drive shaft 79 (see Fig. 4). Thus it may be seen that the drive gears of both conveyors are mounted on the same shaft which is operated by a Geneva gear 96, or intermittently rotated, to eight different positions during a single revolution of the shaft 70, requiring eight revolutions of the drive shaft 35.

Carriers of conveyor 150 like the carriers of conveyor 50, are radially reciprocative in openings in the one flange portion of the carrier 50 the reciprocation of these carriers being accomplished by fingers similar to the finger 110 associated with the carrier 150. These carriers are actuated by a cam in a manner similar to the carriers of conveyor 50. The actuating cam for the carriers of conveyor 150 is constructed differently, however, than the actuating cam in conveyor 50. Fig. 9 illustrates the cam 320 associated with the carrier actuating levers of the conveyor 150. This cam 320 differs from the cam 120 in that it has no spaced lugs comparable to lugs 125 and 126 of cam 120. Cam 320 has two lugs 232 and 327 facing each other and spaced apart and at right angles to these lugs similar lugs 324 and 328 are provided. Thus, each time cam 320 is reciprocated only two levers in the conveyor 150 are actuated instead of four as in the conveyor 50.

The carriers of the conveyor 150 in the form of tubular members are constructed differently than the carriers of the conveyor 50 as shown in Figs. 14 to 17 inclusive. Fig. 14 shows carrier 390a as consisting of a hollow member slidable in a radial opening in the conveyor 150, the inner end of said carrier 370a having a hardened abutment plug 392 secured therein by a cross pin 393. Between the plug 392 and the inner end of recess 394 in which the plug is secured, there is provided an abutment block 395 secured within the carrier by a cross pin. In the space between the blocks 392 and 395 a cross pin 306 is provided which is engaged by the forked end of the lever 310 which reciprocates carrier 390a in response to reciprocation of the cam 320. A plug 397 is slidably supported in an apertured partition within carrier 390a the inner end of this slidable plug 391 being provided with a head 300 which slidably fits within the recess 394. The head end of plug 397 is recessed to contain a spring 396 which abuts against the block 395 anchored within the recess 394. This spring 396 is predeterminately stronger than the spring 96 in the carriers of the conveyor 50 for purposes to be described. The outer end of the carrier 390a or, more particularly the end of the carrier extending from the conveyor 150, is recessed to provide an annular comparatively thin wall portion 399 which has diametrically opposite elongated slots 400 provided therein. Set screws 401 extend through both these slots and are threaded to the solid end portion 402 of a supporting member or collet 403. As shown in Figs. 15 to 17 inclusive the thin wall portion 404 of the tubular portion of the collet 403 has spaced longitudinal slots 405 extending from the end of the collet 403 flush with the plug 397 to substantially the inner end wall of the solid portion 402 of the collet or supporting member 403. These slots 405 cut thin wall tubular portions 404 of the collet 403 into a plurality of resilient fingers 406 biased outwardly to engage the inner wall of the portion 399 of the carrier in which the collet is slidably supported. The thin wall portion 404 of the collet 403 is reduced in diameter at its outer end forming an annular surface 407 interrupted by the slots 405, this annular surface 407 being normally slightly larger in diameter than the inside diameter of the core sleeve 135 inserted in the annulus within the holding ring 20 by the carriers of the conveyor 50. (See Fig. 14.) The outer edge of the annular surface 407 of the collet 403 is rounded or chamfered so that this smaller diameter portion 407 thereof may be moved to enter within the core sleeve 135 when the respective carrier, 390a in this instance, coaxially aligns with the holding ring 20 during the operation of the machine. It will, of course, be understood that when the smaller diameter portion 407 of the collet 403 is forced into the core sleeve it will be slightly contracted, the resiliency of fingers 406 urging this end portion of the collet 403 into a gripping engagement with the surrounding core sleeve 135. Between the ends of the collet 403 the thin walled portion 404 thereof has an outwardly extending annular ridge 408.

The collet 403, as previously described, is slidably carried in the tubular end portion 399 of the carrier and thus the ridge 408, being slightly greater in diameter than the body portion 404 of the collet, will cause the collet to be contracted as it is moved into the carrier. When the carrier is again moved into the conveyor 150 to assume its normal position, the screws 401 will engage the face of the conveyor and will cause the collet to be moved outwardly of the carrier so that the ridge 408 will be positioned outside the carrier adjacent its outer end. This permits the split portion of the collet to expand and assume its normal size as the collet extends outside the carrier.

When the conveyor 150 is in the position as shown in Fig. 2 a carrier thereof, more particularly the carrier 390f, as shown in Fig. 2 aligns with the leading clamping ring within the chute 337. This chute picks up clamping collars from the drum 336 and arranges said clamping collars in a continuous row, delivering them so that the leading clamping collar is placed in a position in coaxial alignment with the conveyor 390f. The clamping collars in the chute 337 are designated in Fig. 10 by the numeral 355. The platform 22 supports a block 420 having a recess 421 provided with two diameter portions, the larger portion thereof having a piston guide collar 422 secured to the block by set screws 423. Within the larger diameter portion of the recess a piston 424 is reciprocatively supported, the smaller diameter portion thereof slidably fitting within the guide collar 422 and having a reduced diameter tubular extension 425 the outer end of which is recessed to provide a receptacle for the leading clamping collar 355, the recess having a stop shoulder 426 whereby the leading clamping collar 355 is located upon the tubular extension 425 of the piston 424 in coaxial alignment with the radially movable carriers of the conveyor 150, in this instance the carrier 390f. Fluid pressure ports 427 and 428 are provided in the block, the port 427 leading to the cylinder on one side of piston 424, the port 427 to the cylinder on the opposite side of the piston whereby the piston may be reciprocated by fluid pressure as it is directed into the cylinder. When fluid pressure is directed through the port 427 the piston 424 is urged outwardly of the recess or cylinder 421 thereby causing the piston extension to move outwardly and carry its supporting clamping ring outwardly so that the clamping ring is slipped over the thin walled portion 404 of the carrier 390f, the movement of the piston moving the clamping ring toward and substantially against the annular rigid extension 408 on the expansible and contractable portion 404 of the carrier 390a. With the clamping ring placed in position on the carrier, fluid pressure is directed to the port 428 into the recess or cylinder 421 thereby causing the piston 424 to be retracted into the normal position as shown in Fig. 10. The extended position is shown in Fig. 11.

It will be seen that carrier 390f is not extended from the conveyor 150 at the station in which it aligns with the clamping collar applying mechanism end block 420 and thus screws 401 engage the face of the conveyor 150. This positively holds the collet while the clamping ring is forced upon its end portion 407 and contracts the same to hold the ring thereupon.

Inasmuch as the conveyor 150 rotates clockwise carrier 390f will be moved to the nine o'clock position upon the next incremental rotation of the conveyor 150 in which position the carrier is again not extended. At the next station or more particularly at the eleven o'clock position of the conveyor 150, the carrier is likewise retained in the retracted position. When next moved through the 45° increment rotation clockwise the carrier 390f will be extended so that at this station the carrier 390f with its applied clamping ring will have insulating washers applied thereto. In Fig. 2 the carrier 390c is shown in this position. At this station a punch and die mechanism as provided at the same station relative to conveyor 50, forms and adds the insulating washer upon the carrier extended at this station. The carrier is extended at this station due to the fact that the finger 310 thereof is moved into alignment with the spaced lugs 323 and 327 of cam 320 and when reciprocated said cam will actuate the finger 310 to move its carrier outwardly of the conveyor 150 into the position as shown in Fig. 2. The carrier is maintained in this extended position until the punch and die mechanism has formed an insulating washer and places the same upon the carrier adjacent the clamping collar thereon after which the carrier will be retracted into the conveyor 150 by the reciprocation of cam 320 to its opposite or rear position. Following this the conveyor 150 is again rotated clockwise for 45° of the revolution thereof bringing it into the one o'clock position as regards Fig. 2 where in Fig. 2 the carrier 390b is shown. In this position the finger 310 of the carrier aligns with a space between the pairs of extending lugs 323 to 327 and 324 to 328 so that reciprocation of the cam at this station of the conveyor 150 will cause no actuation of the finger 310 connected with the carrier 390f so that the carrier is thus retained in retracted position. When the carrier is moved to the three o'clock position at the end of the next 45° increment rotation of conveyor 150 carrier 390f will be moved into the position as shown occupied by carrier 390a in Fig. 2. In this position the carrier is actuated into its extended position for the purpose of placing the insulating washer and clamping collar thereon upon the extending portion of the core sleeve within the assembly in the clamped holding ring 20.

When the carrier is extended at the three o'clock station of the conveyor 150, as shown in Fig. 2, the reduced diameter portion 407 of the collet 403 on said carrier will be moved to enter the core sleeve held in the commutator assembly in the clamped holding ring 20 by a carrier of the conveyor 50. Forward movement of the carrier on conveyor 150 at this station will cause the plunger 397 to engage the plunger 98 in the carrier 50 and due to the fact that spring 396 is heavier than spring 96 in the carrier of conveyor 50, this plunger 397 in moving forwardly will urge the plunger 97 inwardly of the carrier and conveyor 50 thereby moving the cone-shaped surface 99 on said plunger 97 away from the gripping balls 103 thereby releasing their holding effect upon core sleeve 135 within the assembly and the clamping holding ring 20. Forward movement of the carrier in conveyor 150 also causes the main carrier body to move relatively to the collet, contracting said collet by riding over the ridge 408 thereon. Now the main body portion 399 of the carrier, 390a in this instance, pushes the clamping collar from the contracted collet 403 onto the end of the core sleeve 135 extending from the assembly in the clamping ring 20. It will of course be understood that the insulating washer on the carrier 390a adjacent clamping collar will be moved with said clamping collar so that the insulating washer is clamped between the one side of the assembly held in the holding ring 20 and the clamping collar being placed thereon. Upon reversal or retraction of the carrier 390 in conveyor 150 the main body portion thereof including the portion 399 will be moved rearwardly, the spring 396 maintaining the plunger 397 in engagement with the plunger 97 in the carrier of the conveyor 50 until the head of said plunger is engaged by the inwardly moving body of the carrier 390a at which time the plunger 397 is moved away from the clamped holding collar and is returned to its normal position relatively to the conveyor 150. Now the assembly within the clamped holding collar 20 is provided with a core sleeve 155 supporting suitable insulating washers and clamping collars at each end thereof and ready for the next operation in another machine for the purpose of securely fastening the core sleeve and clamping collars within the assembly now held in the supporting ring 20.

The fingers 310 actuating the carriers of the conveyor 150 are, as has been described, operated by cam 320 when said carrier is rotated to bring one finger in the 12 o'clock position, the other finger in the three o'clock position of said conveyor. In the other positions these fingers can not be actuated by the reciprocating cam 320. The reciprocating cam 320 is moved back and forth by a power device corresponding to power device 91 associated with the operating mechanism of the conveyor 50, this power device for actuating the fingers 310 in the conveyor 150 being rendered effective at properly timed intervals by the cam 450 shown in Fig. 4, to be mounted on the drive shaft 35. Fig. 4A shows this cam mounted on shaft 35 and operating a lever 460 which in turn actuates a control device for regulating the application of power to the power device that actuates cam 320.

Recapitulating generally we find that any suitable power device controlled by a master manual control system or valves is operatively connected to a sprocket 48 by a chain 49 for continually driving one portion of a single revolution clutch 47. The drive shaft 35 adapted to be operated by the power device when the clutch 47 is rendered effective for one revolution it is driven for that one revolution so as to operate the various cams 210, 220, 206, 151, 215, 450 and the cam 506 for one revolution, said cam 506 being the one comparable to cam 206 for activating the power mechanism which drives the insulating strip feeding mechanism and the punch and die mechanism for punching the washers therefrom. The cam 506, similar to cam 206, controls the operation of this insulating washer mechanism associated with the conveyor 150. Shaft 35 has the actuator and locking member 95 for the Geneva gear attached thereto, this member 95 rotating the Geneva gear ⅛ of a complete revolution in each single revolution of the drive shaft 35. The member 95 also locks this Geneva gear against any rotative movement while said member is not in driving relation with said Geneva gear.

The Geneva gear in turn rotates the shaft 29 intermittently through 45° of a complete revolution for every single revolution of the drive shaft 35 and thus the two pinions 78 and 378 thereon rotate their respective pinions 77 and 377 connected thereto to operate the two conveyors 50 and 150 through 45° of movement of a complete revolution the conveyor 50 in a counterclockwise direction, the conveyor 150 in a clockwise direction. At each pause of the conveyor 50 after a 45° movement thereof four alternate carriers thereon are extended, the four intermediate carriers thereof are held in retracted position. On the other hand when the conveyor 150 is at the end of each 45° movement thereof two alternate carriers thereon are extended while all of the remaining carriers thereof are maintained in a retracted position.

The four extended carriers on the conveyor 50 are operative, the first to receive a core sleeve, the second to receive a clamping collar on a core sleeve already thereon, the third to receive an insulating washer or washers to be placed against the clamping collar already thereon and the fourth to place the contained core sleeve insulating washer and clamping collar in and upon the assembly within the holding ring clamped in position in the machine. At one station of the conveyor 150, when said conveyor is held against rotation, one carrier thereof receives a clamping collar without being extended from said conveyor. Another conveyor, while extended, receives an insulating washer or washers, placed against the clamping collar already thereon, while another extended conveyor places said clamping collar and its washer upon the core sleeve in the assembly in the clamping holding ring 20 by virtue of said core sleeve having been placed in the assembly in the holding ring 20 by the carrier of the conveyor 50 also coaxially aligned with the assembly at this station.

The machine, after the manual control mechanism has been closed to render the main machine operative, is set in motion by the leading holding collar in the source of supply as it rolls into position in which mechanism is actuated by said holding collar to operate a micro-switch which renders an electromagnet active to release the clutch 47 so that it may be rotated for one revolution only by the driving sprocket 48, thereby rendering effective the various cams thereof which render other elements as aforedescribed, operative in properly timed sequence during this one revolution of the drive shaft 35.

From the aforegoing it may be seen that the entire machine is automatic and continually assembles core sleeves, insulating washers and clamping collars in the one portion of the commutator assembly which, after the operation has been completed by this machine, is released to be transported to another machine for another operation.

While the embodiment of the present invention as herein disclosed, constitutes a preferred form, it is to be understood that other forms might be adopted.

What is claimed is as follows:

1. In a machine for assembling commutator parts, said machine consisting of a frame having two opposite, spaced walls each supporting an attached collar in coaxial alignment; a bearing sleeve extending into and supported between said collars and immovable relatively thereto; a tubular member rotatably carried by said bearing sleeve, said member having an outwardly extending, disclike flange; a pair of meshing gears, one of which is mounted upon and secured to said tubular member, the other being secured to an intermittently rotated, power driven shaft; a disclike conveyor carried by said tubular member and attached to its flange, said conveyor having a plurality of equally spaced radial passages; a carrier slidably supported in each conveyor passage; a plurality of radial slots in said conveyor, equal in number to and each communicating with a respective passage; a shifter lever pivotally secured in each slot, each lever having an end operatively connected with the carrier in the passage communicating with the slot in which the respective lever is secured, each lever also having an angular arm portion extending radially toward the axis of the conveyor; an interrupted spool-cam reciprocatively carried by the said bearing sleeve, said cam having a plurality of diametrically opposite, outwardly extending lugs, grooved circumferentially of the cam for receiving the angular arm portions of shifter levers when said conveyor has been rotated to move said levers into radial alignment with extending lugs of the cam; a reciprocative shaft in said bearing sleeve, said shaft having an end thrust button attached to its one end for engagement with the bearing sleeve supporting collar to limit the movement of said shaft in one direction; a pin secured to said shaft, extending through an elongated slot in the bearing sleeve and attached to the spool-cam for causing reciprocation of the shaft to reciprocate said cam on the bearing sleeve; power means connected to said driven shaft and activated at predetermined timed intervals for intermittently rotating the conveyor in one direction; and power means connected with the reciprocative shaft for moving said shaft back and forth during the time of inactivity of the drive shaft.

2. A machine in accordance with claim 1 in which the conveyor has eight radial passages and a radial slot communicating with each passage, each radial slot having a shifter lever pivotally secured therein, the spool-cam having four, equally spaced, outwardly extending lugs each grooved circumferentially of the cam whereby four alternate shifter levers extend into the spaces between said lugs and the other four shifter levers have their arm portions extending into the grooved lugs when the conveyor is intermittently rotated into its eight positions during one revolution thereof, the actuation of said shifter levers by reciprocation of the spool cam actuating the alternate carriers connected to said levers so that one carrier is supplied with a core-sleeve, another with a clamping ring, still another with an insulating washer and the fourth carrier injects its core-sleeve with clamping ring and insulating washer into the annulus assembled in a holding ring clamped in the machine; and means operative to provide said core-sleeve, clamping collar, insulating washer and holding ring at the proper stations in the machine.

3. A machine for assembling commutators by placing a core-sleeve, insulating washers and clamping collars upon an annulus of bars and separators in a holding ring, said machine having means operative to direct a holding ring into a fixed position and clamping means clamping it in said position; two rotary conveyors each having eight, equally spaced carriers radially movable relatively to the carriers; means connected to both conveyors, operative intermittently to rotate said conveyors so that each carrier thereon is moved into and temporarily held at rest at eight successive stations during one revolution of the conveyor, at one of said stations a carrier of each conveyor faces and is coaxially aligned with the holding ring; means in the one conveyor operative concurrently to extend and retract four alternate carriers in said conveyor each time the conveyor is at rest, one carrier always facing and coaxially aligning with the holding ring; means operative to provide a core-sleeve to another of said four carriers, a clamping collar to the third and an insulating washer to the fourth carrier when they are extended, the said one carrier applying the core-sleeve, collar and washer to the annulus in the holding ring when said carrier is extended; means in the second conveyor operative concurrently to extend and retract two alternate carriers of the eight in said conveyor each time the conveyor is at rest, the one carrier, facing and axially aligning with the holding ring and when extended placing a clamping collar and insulating washer on the core-sleeve inserted into the annulus in the holding ring by the carrier of said one conveyor; means operative to apply an insulating washer to the second extended carrier on said second conveyor; and means operative to apply a clamping collar to one of the carriers on said second conveyor before it is moved into the washer receiving station.

4. A machine for assembling commutators by placing a core-sleeve, insulating washers and clamping collars upon an annulus of metal bars and insulating separators in a holding ring, said machine having two rotatable conveyors each provided with eight equally spaced carriers radially reciprocative relatively to said conveyors; means operative intermittently to rotate and temporarily hold both said conveyors in eight separate positions during one revolution thereof; levers in the one conveyor, each engaging a carrier thereon, said levers being operative to extend and retract concurrently, four alternate carriers each time the said one conveyor is held in each one of said eight positions; a chute on the machine for conducting clamping rings to a predetermined station in the machine so that the lead ring coaxially aligns with a carrier upon which a core-sleeve has been placed whereby the core-sleeve is slipped into said clamping ring; a pusher slidably supported in the machine coaxially of the clamping ring to be placed upon the core-sleeve on the carrier; and interconnected pivoted levers one engageable by the lever actuating the adjacent carrier, the other engaging the pusher, said levers being operative by the carrier actuating lever to force the pusher against the adjacent clamping ring and thereby urge said clamping ring into predetermined final position upon the core-sleeve supported by the carrier in line with the pusher.

5. A device in accordance with claim 4 in which the chute in the machine delivers the leading clamping ring in the chute to a position behind spring loaded members which hold said ring against a position stop and in coaxial alignment with a carrier on the said one conveyor, the pressure of the pusher upon the clamping ring urging the clamping collar past the spring loaded members and into final predetermined position on the core-sleeve carried by the conveyor.

6. A machine for assembling commutators by placing a core-sleeve, insulating washers and clamping collars on an annulus of metal bars and insulating separators held in a holding ring, said machine having means for directing a holding ring to a predetermined station in the machine and rigidly clamping said ring at said station; two rotatable conveyors each having eight equally spaced carriers radially reciprocative therein; a common means connected to both conveyors, said means being operative to rotate said conveyors intermittently so that successive carriers on both conveyors coaxially align with the clamped holding ring and are temporarily held in such alignment; predeterminately spaced means on the machine adjacent the one conveyor, one of said means providing a core-sleeve for each carrier as the conveyor stops rotation, the second a clamping ring slipped on the sleeve supporting carrier aligned therewith and the third an insulating washer, the sleeve, collar and washer on each carrier being applied to the annulus in the holding ring clamped in the machine as said carrier aligns with said ring; a chute operative to deliver clamping rings to a predetermined station adjacent the second conveyor; power actuated means for engaging and urging the lead ring from said chute upon each carrier of said second conveyor when a carrier aligns with the lead ring in the chute; means operative to place an insulating washer upon each carrier adjacent the clamping ring thereon, said carriers each being actuated, when aligning with the clamped ring, to place the clamping ring and washer upon the core-sleeve inserted into the annulus in the holding ring by a carrier of the said one conveyor; and means engaging the carriers of both conveyors, operative to reciprocate the proper carriers at predetermined timed intervals relatively to the conveyor rotating means.

7. A machine in accordance with claim 6, in which the means operative for engaging and urging the lead ring in the chute upon a carrier of said second conveyor consists of a block attached to the machine, said block providing a cylinder in which a piston is reciprocated, the outer end of said piston being shaped to provide a nest into which the lead clamping ring from the chute is urged by gravity, said piston when urged outwardly of the block by power applied to the cylinder, pressing the nested clamping ring upon the carrier of the second conveyor aligned with said piston.

8. A machine for assembling commutators by applying a core-sleeve, clamping collars and insulating washers to annulus of alternate metal bars and separator strips supported in a holding ring, said machine having two rotatable conveyors; means operative intermittently to rotate into and temporarily hold each conveyor in eight equally spaced stations during one complete revolution of said conveyors; eight equally spaced carriers on each conveyor, said carriers being radially reciprocative in said conveyors; means for receiving and clamping a holding ring between said conveyors so that each carrier on both said conveyors coaxially aligns with said ring at one of said eight stations in the rotation of said conveyors; a plurality of pivoted levers in each conveyor each lever engaging one carrier for reciprocating it in its respective conveyor; a reciprocative, non-rotatable actuator engageable with alternate levers in the one conveyor at each of its eight stations, said actuator operating the four alternate levers to extend and retract their respective carriers while the conveyor is held motionless at each of its eight stations one of which is the station at which the holding ring is clamped; a second reciprocative, non-rotatable actuator engageable with two alternate levers in the second conveyor when said conveyor stops at each of its eight stations, the carrier engaged by one of said two levers being in coaxial alignment with the clamped holding ring; power means rendered active to reciprocate both actuators concurrently, in timed relation to the said means intermittently rotating the conveyors; means provided at three stations of said one conveyor the one means providing a carrier of said one conveyor with a core-sleeve, the second means providing a clamping ring for the core-sleeve on the carrier at this station and the third means providing an insulating washer for the core-sleeve and clamping ring on the carrier at this station, the fourth station being the one where the holding ring is clamped and where extension of the carrier places the core-sleeve, clamping ring and insulating washer upon the annulus in the clamped ring; means provided at two stations of the second conveyor, one for slipping a clamping ring on a retracted carrier in said second conveyor, the other for placing an insulating washer upon the collar bearing carrier, said carrier, when moved into alignment with the clamped holding ring, being extended to transfer the clamping ring and insulating washer thereon to the core-sleeve inserted into the annulus in the holding ring by a carrier of the said one conveyor.

9. A machine in accordance with claim 8, in which all carriers of said one conveyor are tubular, radial openings near the outer end of each carrier having clutch members urged outwardly by the cone shaped portion of a spring loaded plunger slidably supported in the carrier and normally extending from the outer end thereof, said clutch members being wedged into gripping engagement with the core-sleeve picked up by said carrier at one station of said one conveyor, for retaining the core-sleeve on the carrier during rotation of the conveyor to its other stations.

10. A machine in accordance with claim 8, in which each carrier of the second conveyor consists of a tubular member provided with a longitudinal slot in its annular wall adjacent its outer end; a collet slidably supported in the outer end of the carrier, said collet having a thin wall portion, longitudinally slit to form resilient wall sections normally extending from said carrier, its sliding movement in the carrier being limited by a stop screw extending through said longitudinal slot and threaded into said collet; a plunger slidably supported in the carrier and the collet; a spring engaging the plunger and yieldably urging the plunger toward its outermost position in the carrier, the outer end of said collet being shaped to enter into and grip the core-sleeve in the annulus of the clamped holding ring when the carrier is extended to place its clamping collar and insulating washer upon said core-sleeve.

References Cited in the file of this patent

UNITED STATES PATENTS

| Number | Name | Date |
|---|---|---|
| 1,462,305 | Snyder | July 17, 1932 |
| 2,006,459 | Jones | July 2, 1935 |
| 2,169,251 | Johnson | Aug. 15, 1939 |
| 2,542,988 | Bureau | Feb. 27, 1951 |

FOREIGN PATENTS

| Number | Country | Date |
|---|---|---|
| 378,774 | Great Britain | Aug. 18, 1932 |